United States Patent [19]

Liggett

[11] Patent Number: 4,603,921
[45] Date of Patent: Aug. 5, 1986

[54] BRAKE PROPORTIONING SYSTEM

[75] Inventor: John V. Liggett, Troy, Mich.

[73] Assignee: Rockwell International Corporation, Pittsburgh, Pa.

[21] Appl. No.: 741,646

[22] Filed: Jun. 6, 1985

[51] Int. Cl.$^4$ .......................... B60T 13/00; B60T 8/18
[52] U.S. Cl. .................................. 303/6 C; 303/22 R; 180/273; 180/290
[58] Field of Search ............ 303/6 C, 22 R, 20, 22 A; 188/349, 195, 109; 180/273, 290

[56] References Cited

U.S. PATENT DOCUMENTS

| | | | |
|---|---|---|---|
| 1,414,255 | 4/1922 | Chmielowski | 180/273 |
| 3,685,868 | 8/1972 | Nagase et al. | 303/22 R |
| 4,050,743 | 9/1977 | Knight | 303/22 R |
| 4,093,316 | 6/1978 | Reinecke | 303/22 R |
| 4,358,163 | 11/1982 | Young | 303/22 R |

FOREIGN PATENT DOCUMENTS 0062246  10/1982  European Pat. Off. .......... 303/22 R

*Primary Examiner*—Bruce H. Stoner, Jr.
*Assistant Examiner*—Alvin Oberley

[57] ABSTRACT

A brake proportioning system for a motor vehicle is responsive to the presence or absence of loads exceeding a threshold at passenger and cargo-carrying locations in the vehicle and includes load presence sensor switches, a signal processing system such as an onboard computer, and an electrically controllable brake proportion valve that has a plurality of finite settings controllable in response to passenger and cargo-load presences in the vehicle. The ratio of rear-to-front braking effort is controlled by the proportion valve so that the ratio increases as the number of passenger and cargo-load presences increases. The location of the loads in the vehicle can also influence the brake proportion ratio.

7 Claims, 4 Drawing Figures

BRAKE PROPORTIONING SYSTEM

FIELD OF THE INVENTION

This invention relates to brake proportioning systems for multi-axle motor vehicles.

BACKGROUND OF THE INVENTION

Prior Art

Brake proportioning systems for vehicles are generally well-known devices for regulating the rear-to-front brake effort applied to vehicle brakes in response to operator input braking force or motion to prevent premature lock-up of rear wheels of the vehicle during rapid deceleration of the vehicle.

Virtually all multi-axle passenger vehicles in production use some form of brake proportioning valve to regulate the ratio of rear-to-front brake effort to prevent rear wheel lock-up, but these are usually fixed systems that provide a compromise proportioning of brake effort on the basis of an assumed loading of the vehicle.

It is generally recognized that it would be desirable to provide variable brake proportioning ratios in response to vehicle loading to overcome brake proportioning problems encountered with modern passenger vehicles, particularly front-wheel drive vehicles. However, variable load responsive brake proportioning systems that are commercially available or described in prior art literature tend to be complex and costly, which limits their applications in high volume production passenger vehicles. Prior art brake proportioning systems generally involve the use of sophisticated electro-mechanical or electro-hydraulic components specifically designed for heavy-duty trucks, rail vehicles, buses and the like, and are regarded as being too complex and expensive to be cost-effective for use in automobiles or light trucks.

Examples of such prior art designs are described in U.S. Pat. Nos. 3,685,868; 4,093,316 and 4,050,743. In such typical systems, vehicle load distribution is usually detected by an electro-mechanical sensor that generates an analog or digital electric load distribution signal that is processed by a signal processor, including logic circuitry, to vary the ratio of rear-to-front brake effort that will result from operator input application of braking force. These typical systems attempt to constantly monitor vehicle loading and constantly adjust the ratio of rear-to-front braking effort in accordance with proprietary algorithms so as to constantly fine tune the proportioning of brake effort that will be produced when the operator applies input braking force or motion. The proportioning control usually is without regard to vehicle motion or speed, although some brake systems do incorporate anti-skid features that are speed or motion sensitive.

While such prior art systems may be desirable in certain environments, they leave much to be desired from the standpoints of simplicity, cost-effectiveness, reliability and adaptation for high-volume mass production.

SUMMARY OF THE INVENTION

The present invention overcomes the problems of prior art brake proportioning systems by simplifying the total system so that variable proportioning of rear-to-front brake effort in response to vehicle loading is achieved simply by sensing the presence or absence of vehicle driver, passengers and load at the locations in the vehicle normally assigned for same, and adjusting a variable brake proportioning valve to one of a plurality of specific settings depending on the number and location of presences sensed at the driver, passenger and load locations.

In addition, this invention provides for a vehicle speed responsive input to the system that prevents the proportion ratio from changing when the vehicle is moving to prevent transient conditions from affecting the proportion setting that has been initially established when the vehicle was loaded during the previous stop condition.

Through the use of widely available onboard vehicle computers, an electrical brake proportion control signal can easily be generated in accordance with a selected algorithm to control the setting of a conventional electrically operated brake proportioning valve in the vehicle brake system in response to driver, passenger and load location and presence. Simple micro switches in the driver, passenger and load carrying areas of the vehicle, a speed sensor and connector wiring complete the basic system of the invention.

DETAILED DESCRIPTION OF PREFERRED EMBODIMENT

Figure 1:
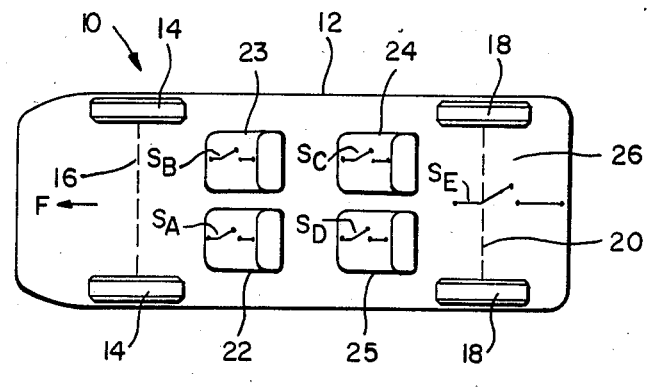
FIG. 1 is a schematic illustration of a multiaxle motor vehicle showing load sensor switches at the driver, passenger and load carrying locations on the vehicle.

With reference to FIG. 1, a schematic illustration of a passenger motor vehicle 10 is presented, the vehicle including a body 12, a front wheel set 14 on a front axle 16 and a rear wheel set 18 on a rear axle 20. It is to be understood that the designation "axle" can refer to an actual axle extending between the wheels, or a figurative axle corresponding to the axis of rotation of the front and rear wheels 14,18. It is well recognized that wheel axles do not necessarily traverse a passenger vehicle when the wheels are independently suspended on the vehicle; however, it is common to characterize the front and rear wheels as being located at the front and rear axle of such vehicles for convenience sake. Whenever the term "axle" is used in this description and the claims of this application, such expression shall always be intended to broadly connote the effective axle location for the vehicle.

Driver and passenger seats 22, 23, 24 and 25 are provided on or within the vehicle and a load-carrying compartment 26 is located towards the rear of the vehicle. Generally, the body 12 of the vehicle will be an enclosed compartment for the passengers and load, with the latter comprising a luggage carrying area such as a trunk or an open rear space in the case of a hatchback-type vehicle. However, the vehicle could also be a light truck in which two or three passengers could be seated forwardly with the rear area constituting a cargo carrying volume.

Weight sensing micro switches $S_A$, $S_B$, $S_C$, $S_D$ and $S_E$ are provided at the driver, passenger and load-carrying regions of the vehicle for detecting the presence of weights above a predetermined minimum threshold at each location. The switches preferably are conventional two-way operating (open-closed) so that the absence of such weights also can be determined by sensing the condition of the switch. A plurality of switches $S_E$ could be provided in the cargo carrying area of the vehicle if desired to sense the presence of multiple or large loads.

The sensitivity of the switches can be pre-set or can be adjustable, depending upon the vehicle and the preference of the manufacturer. It is contemplated that the switches would be sensitive to loads above a minimum that would correspond to an adult passenger in the weight range of approximately 90-150 pounds, and a cargo load of approximately 50-75 pounds. However, the threshold sensitivity of the switches can be adjusted in accordance with the configuration and brake system of the individual vehicle and furthermore the sensitivity of the individual switches can be varied to influence the brake proportion ratio depending on the particular location of the switch in the vehicle. For example, the presence of a load at the cargo carrying area 26 of the vehicle could be sensed at a lower threshold by switch $S_E$ than for example, the threshold established for sensing the presence of a passenger at seat 23 by switch $S_B$. This would permit greater sensitivity and response to a load placed over the rear axle location of the vehicle than a load presence detected closer towards the front axle 16 of the vehicle.

Figure 2:
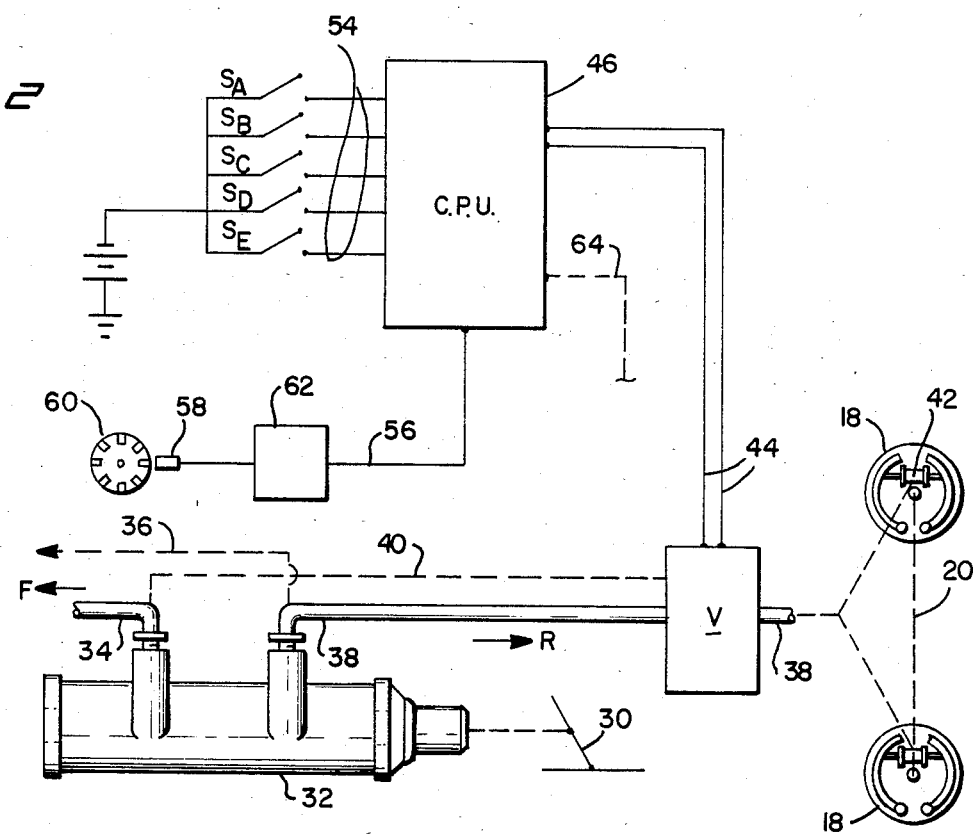
FIG. 2 is a schematic representation of the brake proportioning system constructed in accordance with this invention.

In FIG. 2, a system utilizing the signals generated by the switches $S_A$-$S_E$ is illustrated in combination with a vehicle braking system including a brake proportion valve V.

The vehicle braking system is schematically illustrated and includes an operator input pedal 30 that ultimately actuates a vehicle master cylinder 32 (assuming a hydraulic brake system), either directly as shown or through a power assist system (not shown). While a master cylinder is illustrated in the preferred embodiment, the equivalent thereof in an air brake system could be used with this invention.

The master cylinder 32 as illustrated is a conventional, dual piston arrangement that provides split operation between front and rear brakes. That is, the forward part of the master cylinder controls hydraulic brake pressure supplied to one front and one opposite side rear brake while the rear portion of the master cylinder controls brake pressure to the opposite front wheel and the opposite rear wheel. This example is illustrative and is not intended to be limiting with respect to this invention, since the invention can be applied as well to a single master cylinder system wherein the brake pressure is equally transmitted to all four wheels.

In the specific example illustrated, brake pressure to the forward wheels is transmitted through lines 34, 36, while brake pressure to the rear wheels is transmitted through lines 38, 40.

The brake proportion valve V is a conventional, electrically operated proportioning valve that varies the ratio of rear to-front brake effort by restricting the brake pressure in lines 38 and 40 upstream of the wheel brake operating cylinders 42 in the rear wheels. In accordance with this invention, the valve V is controlled in response to electrical signals supplied via leads 44 from a signal processor 46.

Valve V is intended to be adjustable in response to electrical input signals to any one of a plurality of finite settings, for example four settings. Each setting progressively increases the ratio of rear-to-front braking effort in response to vehicle operator input braking force or motion applied at pedal 30.

Figure 3:
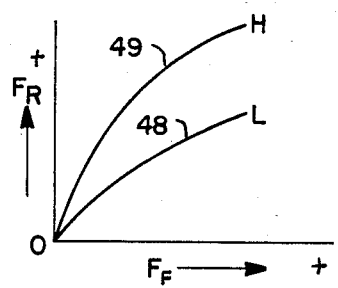
FIG. 3 shows a diagram of ideal or desired rear-to-front brake force ratio curves for light and heavily loaded passenger vehicles.
Figure 4:
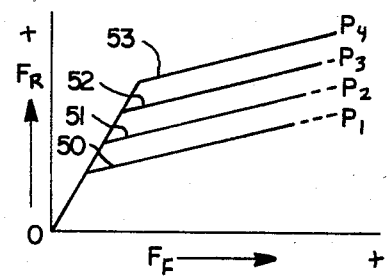
FIG. 4 shows a diagram of rear-to-front brake effort ratio curves resulting from this invention.

This will be better understood with reference to FIGS. 3 and 4 of the drawings. In FIG. 3, curves 48 and 49 represent brake proportion values between rear and front braking forces $F_R$ and $F_S$, respectively. Curve 48 is representative of a desirable or ideal proportion curve for a lightly loaded vehicle while curve 49 shows a proportion curve for a more heavily loaded vehicle. Most passenger vehicles with fixed proportioning valves strike a compromise between the curves 48 and 49.

FIG. 4 shows proportioning curves obtained by the present invention, wherein the proportion of rear-to-front braking force ($F_R/F_S$) is illustrated by a family of four curves 50-53 that illustrate brake proportion settings of valve V at $P_1$, $P_2$, $P_3$ and $P_4$, respectively.

As illustrated in FIG. 4, with valve V set at $P_1$ proportion, the ratio of rear-to-front brake force increases less rapidly than, for example, the setting of $P_4$, where the ratio of rear-to-front braking effort is permitted to reach a higher value. The setting $P_1$ of valve V, accordingly, would assume a lightly loaded vehicle or a vehicle in which the load was located closer to the front axle 16 than the rear axle 20. The proportion setting $P_4$ of valve V would result if multiple load presences were sensed in the vehicle or a higher loading of the vehicle towards the rear axle than the front axle.

The specific brake proportion setting of valve V is determined by the signal processor 46, which could be, for example, an onboard vehicle computer of any suitable type used with passenger vehicles and having specific input ports for electrical signals resulting from activation of switches $S_A$-$S_E$ via leads 54. A separate lead 56 communicates a vehicle speed signal to an input port of the signal processor 46 from a speed responsive pick-up 58 or the equivalent which detects the speed of the vehicle, for example, by detecting the speed of rotation of the drive shaft 60 or an equivalent thereof to provide input to a suitable signal converter 62 that converts the signal from the detector 58 to an appropriate signal usable by the signal processor 46 via lead 56. If desired, the signal processor 46 also could include an additional output port communicating with line 64 if it should be desired to control more than one proportioning valve V in the brake system of the vehicle, for example, in a vehicle having multiple rear axles.

The signal processor 46 would include appropriate circuitry designed in accordance with well-known principles to receive input signals via leads 54 from switches $S_A$-$S_E$ and to process such signals in accordance with an appropriate algorithm so as to generate a finite number of brake proportion signals to be communicated to brake proportion valve V. In the example shown in FIG. 4, signal processor 46 would be arranged so that one of four signal levels could be transmitted to proportion valve V to produce rear-to-front brake effort ratios $P_1$-$P_4$, depending upon the number and location of weights sensed by switches $S_A$-$S_E$. Moreover, the signal processor 46 would also be arranged so that a proportion signal transmitted to control valve V would not be altered from one proportion setting to the next for so long as the vehicle is in motion. This latter feature is considered to be highly desirable to avoid adjustment of the rear-to-front brake proportion effort in response to transient conditions or shifting of vehicle load during rapid deceleration of the vehicle such as could occur during a violent braking or steering maneuver. Thus, once the proportion valve V is set in response to the detection of the presence of loads at switches $S_A$–$S_E$, no further adjustment of valve V can occur until the vehicle is at rest.

It will be understood that the various proportion settings of valve V can be any desired number to achieve the objectives of the invention. However, for the sake of simplicity, the number of valve settings can be limited to the number of load sensing switches provided in the vehicle, including or not including the switch at the driver location, depending upon the requirements of the system. In the preferred embodiment, the number of valve proportion settings $P_1$–$P_4$ would correspond to the number of switches $S_A$–$S_E$, less the single switch $S_A$ for the driver. It may even be desirable in some instances to eliminate switch $S_A$, since it may be assumed that there will always be a driver in a moving vehicle. However, switch $S_A$ may be included to provide logic control for the signal processor 46 and to provide a complete signal input via leads 54 that will be indicative of the placement of the loads within the vehicle.

Thus, this invention provides a very simple approach to proportioning rear to-front brake effort ratio by simply sensing the presence of a specific number of loads at specific locations within the vehicle and utilizing the signals generated by the sensors to produce a specific, finite number of valve settings that will approximate an ideal or desirable rear-to-front brake proportion setting of a brake proportion valve in the brake system of the vehicle. The invention eliminates the need to precisely determine the actual amount of load or the load balance on the vehicle and eliminates the need to precisely adjust a brake proportioning valve continuously in response to the total quantity of such loads or their location. Moreover, once the brake proportion valve of this invention has been set to achieve a certain rear-to-front brake proportion ratio, the proportion setting will not be adjustable again until the vehicle comes to rest.

While a single embodiment of the invention has been illustrated, it is to be understood that the scope of the invention is not to be limited to this specific embodiment, which can be modified in accordance with well-known principles by those skilled in the art without departing from the invention, the scope of which is encompassed by the appended claims.

What is claimed is:

1. A process of proportioning multi-axle brake efforts for a passenger vehicle having a driver seat, one or more passenger seat or seats and a load-carrying space, wherein the brake effort on at least one axle is proportioned in predetermined relationship with respect to the brake effort on at least one other axle of the vehicle, comprising:
   (a) sensing the presence of loads exceeding a selected threshold at at least the passenger and luggage-carrying space locations of the vehicle and generating electrical load presence signals representative of each such presence;
   (b) processing said load presence signals to drive a predetermined finite number of brake proportion control signals corresponding to a predetermined number of brake proportion settings depending upon the location and number of the sensed load presences;
   (c) transmitting said brake proportion control signals to an electrically controlled brake proportion means in the brake operating circuit of the vehicle to thereby regulate the proportional effort applied by the brakes on different vehicles axles in response to brake effort applied by a vehicle operator.

2. A method as claimed in claim 1, including sensing vehicle speed and generating an electrical speed signal related to such speed; processing the electrical speed signal with the load presence signals in such a manner that said brake proportion control signals can only be utilized to adjust said brake proportioning means between brake proportion control setting when the vehicle is at rest.

3. A method as claimed in claim 1 where processing of the load presence signals is carried out in a manner to produce resultant brake proportion control signals that are responsive to the location, as well as the existence of said load presences.

4. A method as claimed in claim 1 wherein the process is carried out with the number of available brake proportioning settings corresponding to the total number of presence sensors provided at the passenger and load locations in the vehicle.

5. A brake effort proportioning system for a multi-axle vehicle for varying brake effort proportionally between rear and forward axle locations of the vehicle, the vehicle including a braking system, a driver seat, one or more passenger seats and a rearward load-carrying space, comprising:
   (a) an electrical switch means for sensing the presence of at least one passenger and a load, each having a weight greater than a predetermined threshold at each passenger seat and at said load-carrying space of the vehicle and for generating electrical weight presence signals;
   (b) means for electrically energizing the switch means;
   (c) a signal-processing means;
   (d) means for transmitting electrical weight presence signals generated by the switch means to the signal processing means;
   (e) said signal-processing means including means for receiving and processing said weight presence signals generated by the switch means so as to generate a predetermined finite number of brake proportion control signals corresponding to brake proportion settings depending on the number of the sensed passenger and load presences;
   (f) brake proportion valve means in the braking system of the vehicle, said valve including control means responsive to said brake proportion control signals for regulating the rear-to-front proportional effort applied by the brakes of the vehicle in response to vehicle operator brake effort input;
   (g) means for communicating said brake proportion control signals to said brake proportion valve control means to cause the proportion control valve to progressively increase the rear-to-front brake effort ratio from an initial lower ratio setting to a higher ratio setting in response to the sensing of a progressively higher number of passenger and load presences.

6. The apparatus as claimed in claim 5, including a vehicle speed sensor means including means for generating a speed related electrical signal and transmitting same to the signal processing means;

said signal-processing means including means for receiving and processing said speed related signal, and means responsive to the speed related signal to prevent adjustment of the brake proportion valve setting while the vehicle is in motion.

7. The apparatus as claimed in claim 6, wherein the number of available brake proportion valve settings of the brake proportion valve corresponds to the number of switch means for sensing passenger and load presences.

* * * * *